US010033200B2

(12) United States Patent
Mai et al.

(10) Patent No.: US 10,033,200 B2
(45) Date of Patent: Jul. 24, 2018

(54) DEVICE FOR BALANCING AN ENERGY ACCUMULATOR

(75) Inventors: Alexander Mai, Munich (DE); Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1183 days.

(21) Appl. No.: 13/412,157

(22) Filed: Mar. 5, 2012

(65) Prior Publication Data

US 2012/0161710 A1    Jun. 28, 2012

Related U.S. Application Data

(63) Continuation of application No. PCT/EP2010/062011, filed on Aug. 18, 2010.

(30) Foreign Application Priority Data

Sep. 10, 2009 (DE) .................... 10 2009 041 005

(51) Int. Cl.
*H02J 7/00* (2006.01)
*B60L 11/18* (2006.01)

(52) U.S. Cl.
CPC ......... *H02J 7/0016* (2013.01); *B60L 11/1861* (2013.01); *B60L 11/1866* (2013.01); *B60L 11/1874* (2013.01); *Y02T 10/7005* (2013.01); *Y02T 10/7044* (2013.01); *Y02T 10/7061* (2013.01)

(58) Field of Classification Search
USPC ....................................... 320/118
See application file for complete search history.

(56) References Cited

U.S. PATENT DOCUMENTS

| 5,850,351 | A | 12/1998 | Lotfy et al. | |
|---|---|---|---|---|
| 6,097,174 | A * | 8/2000 | Yang et al. | ............... 320/119 |
| 7,016,177 | B1 * | 3/2006 | Thrap | ............... 361/502 |
| 7,151,358 | B1 | 12/2006 | Yang | |
| 2003/0094923 | A1 | 5/2003 | Emori et al. | |
| 2004/0263121 | A1 * | 12/2004 | Thrap | ............... 320/119 |

(Continued)

FOREIGN PATENT DOCUMENTS

| DE | 600 23 772 T2 | 8/2006 |
|---|---|---|
| DE | 10 2007 004 569 A1 | 7/2008 |
| WO | WO 2007/104325 A1 | 9/2007 |

OTHER PUBLICATIONS

International Search Report dated Aug. 26, 2011 with English translation (four (4) pages).

(Continued)

*Primary Examiner* — Robert Grant
(74) *Attorney, Agent, or Firm* — Crowell & Moring LLP

(57) ABSTRACT

A device for balancing an energy accumulator, especially an energy accumulator in an on-board power supply system of a motor vehicle, is provided. The energy accumulator is formed by a cell assembly of a serial connection of a plurality of cell groups, respective balancing circuits being connected to voltage connections of respective cell groups and comprising a discharge resistor. The discharge resistor of a respective balancing circuit has a temperature-dependent resistance characteristic, and the discharge resistors of at least some of the balancing circuits are thermally intercoupled.

14 Claims, 2 Drawing Sheets

(56) References Cited

U.S. PATENT DOCUMENTS

2005/0174213 A1\* 8/2005 Venzke .............. G05D 23/2401
338/320
2006/0238165 A1 10/2006 Moore et al.
2007/0001651 A1 1/2007 Harvey

OTHER PUBLICATIONS

German Search Report dated Jul. 21, 2010 with partial English translation (nine (9) pages).

\* cited by examiner

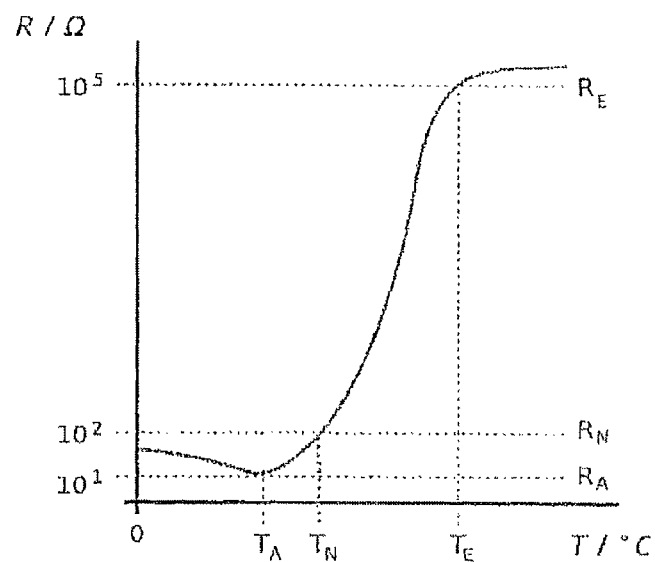
Fig. 2
Fig. 3a
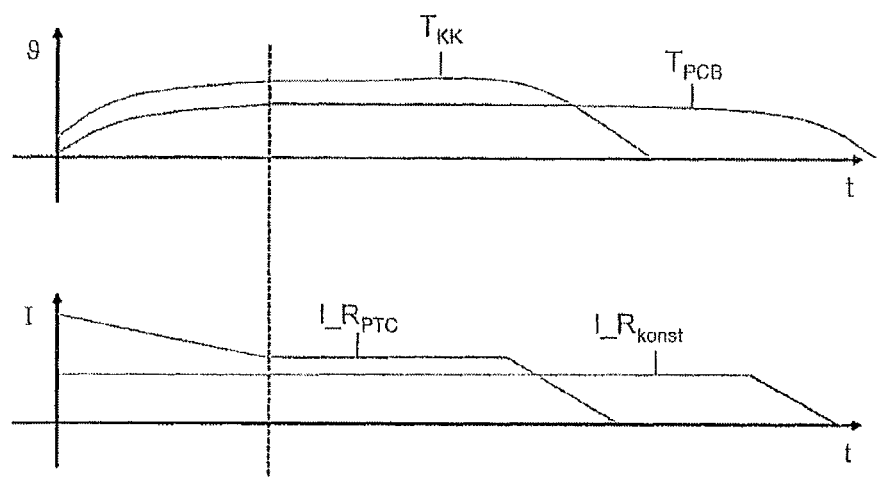
Fig. 3b

DEVICE FOR BALANCING AN ENERGY ACCUMULATOR

CROSS-REFERENCE TO RELATED APPLICATIONS

This application is a continuation of PCT International Application No. PCT/EP2010/062011, filed Aug. 18, 2010, which claims priority under 35 U.S.C. § 119 from German Patent Application No. DE 10 2009 041 005.8, filed Sep. 10, 2009, the entire disclosures of which are herein expressly incorporated by reference.

BACKGROUND AND SUMMARY OF THE INVENTION

The invention relates to a device for balancing an energy accumulator (store), in particular an energy accumulator in a motor vehicle's onboard power supply system, which consists of a cell stack composed of the series connection of a plurality of groups of cells, wherein a respective balancing circuit is connected to voltage terminals of a respective group of cells and comprises a discharge resistor.

A growing trend in the automotive field is to use energy accumulators constructed of individual cells, preferably energy accumulators constructed of double layer capacitors. For providing and storing energy, these double layer capacitors offer the advantage of being able to provide a lot of power in a short period of time. In order to attain the amount of power supply voltage that is required in a vehicle, the individual double layer capacitors have to be connected in series. In this case the series connected cells form a cell stack. For charging, for balancing the cell voltage, for detecting the undervoltage and overvoltage of individual cells, for maintaining the charge of the cells in the stationary operation, for the charging and discharging or the charge reversal between the individual cells, as well as for the diagnosis/monitoring of the individual cells, it is necessary to monitor individual cells or groups of cells. It is known that such monitoring must be provided with cell group logic that is connected to a group of cells in order to monitor and/or control or regulate its voltage. In the context of the invention, a group of cells can also comprise just a single cell. So that the cell voltages of the individual cells or groups of cells do not diverge during the cyclical charging or discharging, it is known to monitor the cell group logics by way of a higher ranking automatic control device, for example a central logic, and to drive it in such a way that a uniform charging and/or discharging is achieved. This approach makes it possible to attain a long service life of the individual cells and, thus, of the entire cell stack.

WO 2007/104325 A1 discloses a diagnostic circuit for an energy accumulator. Upon overshooting and undershooting the voltage of a cell group, the diagnostic circuit impresses the same levels on a diagnostic rail, which can then be used to interrogate a monitored operating parameter of the cell group and/or the cell stack. The described diagnostic circuit is also used for active cell balancing—also equilibration—of the accumulator cells. The balancing is based on the principle of executing a voltage matching among the individual cells or groups of cells of the cell stack. For this purpose, a balancing circuit is connected to voltage terminals of a respective group of cells. The voltage is monitored by a comparator of the balancing circuit that is coupled to the voltage terminals. If a specified voltage value is exceeded in a group of cells, then the voltage terminals of the respective group of cells are short circuited by means of a discharge resistor. This discharge resistor can be used to discharge the group of cells.

The rate of balancing depends on the discharge capacity of the discharge resistors that are used in the balancing circuits. In order to attain the shortest possible discharge time, the resistors have to be dimensioned as small as possible in size. Then, however, the result is a very high heat loss that has to be dissipated in a suitable way. In an energy accumulator with a plurality of series connected cell groups, the balancing circuits, which are assigned to the respective cell groups, including the respective discharge resistor, are mounted on a printed circuit board (PCB). Since a printed circuit board cannot dissipate the heat loss in infinitely large quantities, the resistors are designed as a high impedance type, usually between 10 and 100 ohms. As a result, however, the balancing rate is restricted.

Therefore, the object of the present invention is to provide a device that is intended for balancing an energy accumulator and that makes it possible to balance the groups of cells of the energy accumulator in a simple and fast way.

This and other objects are achieved with a device according to the invention for balancing an energy accumulator, in particular an energy accumulator in a motor vehicle's onboard power supply system, which consists of a cell stack composed of the series connection of a plurality of cell groups. A respective balancing circuit is connected to voltage terminals of a respective group of cells and comprises a discharge resistor. The discharge resistor of a respective balancing circuit has a temperature dependent resistance characteristic. Furthermore, the discharge resistors of at least some of the balancing circuits are thermally intercoupled.

In particular, it is provided that the resistance value of a respective discharge resistor increases with a rise in temperature. Therefore, a respective discharge resistor exhibits advantageously a PTC characteristic. PTC stands for positive temperature coefficient. PTC resistors or, more specifically, PTC thermistors can conduct a current better at lower temperatures than at high temperatures. For this reason their electric resistance increases as the temperature rises. Thus, PTC resistors exhibit a positive temperature coefficient.

According to an additional embodiment, the discharge resistors of a respective balancing circuit are thermally intercoupled. In particular, it is provided that for the thermal coupling of the discharge resistors, they are mounted on a common heat sink. The heat sink is made preferably of a material that conducts heat well, in particular a metal. For practical purposes all of the discharge resistors of all of the balancing circuits of the devices are mounted on a common heat sink. The result is a thermal coupling of the discharge resistors.

In the event that the discharge resistors of the individual cell groups do not operate simultaneously, the amount of thermal energy that can be dissipated relative to an individual group of cells is larger, so that it is possible to achieve a fast discharge of the cell group to be discharged. If a plurality of cell groups of the energy accumulators is discharged simultaneously by way of the respective discharge resistors for the purpose of balancing, then after a period of time the thermal absorption capacity of the heat sink is reached, so that its temperature rises. Then, the temperature of the respective discharge resistors also rises, as a result of which the discharge time may increase, but at the same time the heat loss is reduced.

Consequently, the temperature dependent resistance characteristic of the discharge resistors provides a component protection function. If only one discharge resistor of a balancing circuit is active, then this balancing circuit can use the maximum cooling capacity for the cell group to be discharged. This feature provides a high discharge capacity. Then this higher discharge capacity results in an accelerated balancing—that is, a balancing that is shorter in terms of time. In addition, the procedure according to the invention makes it possible to minimize the dimensions of the heat sink.

In another practical embodiment, a respective balancing circuit is designed as an active bypass balancing circuit. Such active bypass balancing circuits are known, in principle, from the prior art and are disclosed, for example, in the introductory part of the aforementioned WO 2007/104325 A1, the entire disclosure of which is expressly incorporated by reference in the present patent application.

Furthermore, it is provided that a group of cells includes at least one accumulator cell, in particular a double layer capacitor.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a graph showing the known dependence of the resistor on the temperature of a heat sink; and FIGS. 3a and 3b are graphs of exemplary balancing current profiles and heat sink temperature profiles when using a discharge resistor exhibiting a temperature dependent resistance characteristic.

DETAILED DESCRIPTION OF THE DRAWINGS

Figure 1:
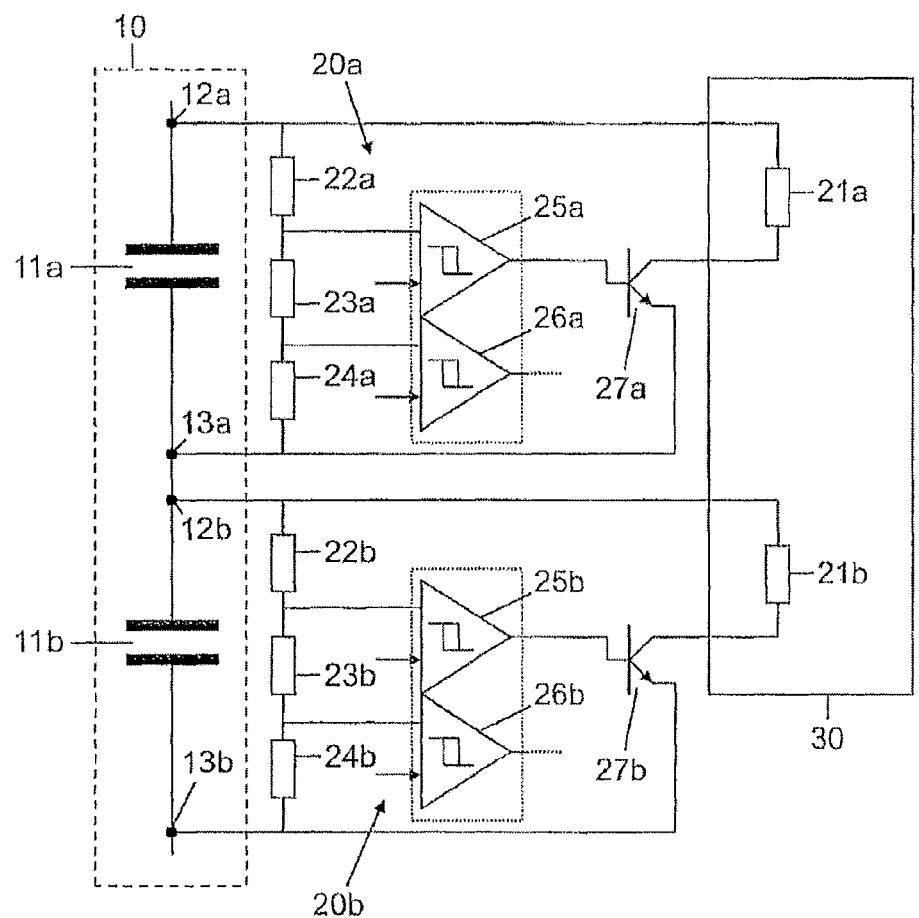
FIG. 1 is a schematic circuit diagram representative of an inventive device for balancing an energy accumulator.

FIG. 1 shows an exemplary embodiment of an inventive device for balancing an energy accumulator 10. The energy accumulator 10 comprises, for example, two series connected cell groups in the form of single cells 11a, 11b. Each of the single cells 11a, 11b is assigned a respective balancing circuit 20a, 20b. The design of the balancing circuits 20a, 20b and the interconnection to the respectively assigned single cell 11a, 11b is identical. Therefore, the following description of the balancing circuit makes reference only to the balancing circuit 20a.

A first terminal of the single cell 11a is connected to a first input 12a of the balancing circuit; a second terminal of the single cell 11a is connected to a second input 13a of the balancing circuit 20a. Between the terminal 12a and the terminal 13a, the balancing circuit 20a includes a series connection consisting of a first resistor 22a, a second resistor 23a and a third resistor 24a. A junction point between the first resistor 22a and the second resistor 23a is connected to a first input of a first comparator 25a, and a high reference voltage is applied to the second input of the comparator 25a. The junction point between the second resistor 23a and the third resistor 24a is connected to a first input of a second comparator 26a; and a low reference voltage is applied to the second input of the comparator 26a. The first comparator 25a and the second comparator 26a can be formed, for example, by a dual operational amplifier. The output of the first comparator 25a is connected to the base of a switching element in the form of an NPN transistor 27a; the emitter of the transistor is connected to the terminal 13a and the collector of the transistor is connected to the terminal 12a of the single cell 11a by means of a discharge resistor 21a. The output of the second comparator 26a is connected to additional elements of the balancing circuit. These additional elements, which are not depicted in FIG. 1, are not relevant for the description of the operating principle of the exemplary device according to the invention and, therefore, are also not described below.

In principle, the balancing circuit can be designed like the diagnostic circuit described in WO 2007/104325 A1 discussed above and expressly incorporated by reference herein. Similarly, the balancing circuit can be formed according to a different principle. What is relevant is only the presence of a respective discharge resistor.

If the voltage applied to the junction point between the first resistor 22a and the second resistor 23a exceeds the high reference voltage applied to the first comparator 25a, then the NPN transistor 27a is closed, so that a current flows over the discharge resistor 21a in order to discharge the single cell 11a. If the voltage applied to the junction point between the first resistor 22a and the second resistor 23a drops below the high reference voltage applied to the reference input of the first comparator 25a, then owing to the hysteresis of the first comparator 25a on reaching a voltage below the reference voltage, the NPN transistor 27a is blocked, so that the discharge via the discharge resistor 21a terminates.

According to the invention, the discharge resistors 21a, 21b of the balancing circuits 20a, 20b of the device depicted in FIG. 1 are designed as PTC resistors, as a result of which their resistance increases with a rising temperature. In general it is preferred that all of the discharge resistors 21a, 21b of all of the balancing circuits 20a, 20b of the device be mounted on a common heat sink 30. The result of this feature is that the discharge resistors 21a, 21b are thermally coupled. In the case that the discharge resistors 21a, 21b of the individual cells are not operated at the same time, the amount of thermal energy that can be dissipated relative to the individual cell is larger. At the same time, the PTC characteristic of the discharge resistors 21a, 21b represents a component protection function.

If only one discharge resistor of a single cell 11a or 11b is active—that is the NPN transistor 27a or 27b of the assigned balancing circuit 20a, 20b is switched into the conductive state—then the respective discharge resistor enables the use of the maximum cooling capacity of the heat sink 30. Thus, the PTC characteristic causes the discharge capacity to increase. The higher discharge capacity results in an accelerated balancing—that is, a balancing that is shorter in time. In addition, the size of the heat sink can be reduced.

FIG. 2 shows the basically well-known resistance performance as a function of temperature of a PTC resistor. The effect of the use of discharge resistors having a PTC characteristic is elucidated by way of the following example.

It is assumed that the temperature of a discharge resistor is $T_N=30°$ C. with a resistance of $R_{30}=R_N$. Hence, the power $P_0$ converted in the resistor amounts to $P_0=U^2/R_N$.

Furthermore, it is assumed that at a temperature T=80° C. the resistance value is $R_{80}=2 \cdot R_N$. The resulting amount is a converted power of $P_{80}=U^2/R_{80}=U^2/(2 \cdot R_N)=0.5 \cdot P_0$.

Therefore, in this example the resistance $R_{80}$ doubles when the temperature increases by 50° C. Hence, at the same voltage the resulting amount is the converted power, and/or within a defined unit of time the resulting amount is the converted energy.

FIG. 3a shows the current and heat sink temperature profiles during a balancing operation, once using a balancing circuit with a discharge resistor having a PTC characteristic and once without the PTC characteristic. FIG. 3a shows the temperature profile of the heat sink, where $T_{KK}$ represents the temperature profile when using a discharge resistor having a PTC characteristic, and $T_{PCB}$ represents the temperature profile when using a discharge resistor without a PTC characteristic. In FIG. 3b the current profile for a discharge resistor having a PTC characteristic is marked $I\_R_{PTC}$, and the current profile for a discharge resistor without a PTC characteristic is marked $I\_R_{const}$. It is very clear that more discharge current flows when a PTC resistor is used. That is, in comparison, the discharge resistor is a lower impedance type, so that the discharge can be terminated at an earlier point in time. Owing to the larger current flowing through the discharge resistor, a larger amount of heat is dragged into the heat sink, so that it assumes a higher temperature than a discharge resistor that has no PTC characteristic and is mounted on the printed circuit board.

When series connected individual cells or groups of cells are balanced, only one of the balancing circuits for discharging the assigned single cell is usually active. If the common heat sink is designed, for example, for eight single cells, then this heat sink is able to dissipate a large amount of thermal energy. The temperature increase that is minimized in this way provides for a high discharge capacity and, thus, for a fast discharge of the single cell, as a result of which the balancing is accelerated.

Therefore, the heat sink provided according to the invention does not have to be designed for simultaneous cooling of all of the discharge resistors of the device. Rather it suffices if the cooling capacity of the heat sink is designed for a predefined portion of the discharge resistors. This feature reduces the size of the heat sink and, thus, reduces the amount of design space required. In addition, a smaller heat sink can be provided at a lower cost.

The use of a "too small dimensioned" heat sink is made possible by limiting the heat input due to the use of discharge resistors having a temperature dependent resistance characteristic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for balancing an energy accumulator in an onboard power supply system of a vehicle, the device comprising:
   a cell stack comprising a series connection of a plurality of cells;
   a plurality of balancing circuits, each balancing circuit being respectively connected to voltage terminals of a cell and comprising a discharge resistor having a temperature dependent resistance characteristic; and
   a common heat sink on which each of the discharge resistors of the plurality balancing circuits are mounted, the common heat sink configured to thermally couple all of said discharge resistors,
   wherein the discharge resistor has a positive temperature coefficient (PTC) characteristic,
   wherein the common heat sink is configured with a cooling capacity that corresponds to less than all of the discharge resistors.

2. The device according to claim 1, wherein a respective balancing circuit is operatively configured as an active bypass balancing circuit.

3. The device according to claim 1, wherein the cell stack comprises a plurality of groups of cells, each group of cells associated with a common heat sink.

4. The device according to claim 3, wherein the at least one accumulator cell is a double-layer capacitor.

5. A method for balancing an energy accumulator in an onboard power supply system of a vehicle, the energy accumulator comprising a cell stack composed of a series connection of a group of cells, wherein a respective balancing circuit is connected to voltage terminals of a respective cell and comprises a discharge resistor, the method comprising the acts of:
   detecting, via the respective balancing circuit, when a defined voltage value for the respective cell is exceeded;
   thermally intercoupling all of the discharge resistors of said balancing circuits using a common heat sink on which said discharge resistors are mounted; and
   discharging the respective cell via the discharge resistor having a temperature dependent resistance characteristic, whereby a faster discharge of the group of cells is obtainable due to the temperature dependent resistance characteristic of the discharge resistor,
   wherein the discharge resistor has a positive temperature coefficient (PTC) characteristic,
   wherein the common heat sink is configured with a cooling capacity that corresponds to less than all of the discharge resistors.

6. The device according to claim 1, wherein the common heat sink, thermally coupling all of the discharge resistors, is further configured for simultaneous cooling of less than all of the discharge resistors.

7. The device according to claim 6, wherein the common heat sink, thermally coupling all of the discharge resistors, is configured for simultaneous cooling of less than all of the discharge resistors as a result of having a cooling capacity based on a predefined portion of the discharge resistors.

8. The method according to claim 5, further comprising providing the common heat sink for simultaneous cooling of less than all of the discharge resistors.

9. The method according to claim 8, wherein providing the common heat sink for simultaneous cooling of less than all of the discharge resistors comprises providing the common heat sink with a cooling capacity based on a predefined portion of the discharge resistors.

10. A device for balancing an energy accumulator in an onboard power supply system of a vehicle, the device comprising:
    a cell stack comprising a series connection of a plurality of groups of cells;
    a plurality of balancing circuits, each balancing circuit being respectively connected to voltage terminals of respective cells and comprising a discharge resistor having a temperature dependent resistance characteristic; and
    a common heat sink on which each of the discharge resistors of the plurality balancing circuits are mounted, the common heat sink configured to thermally couple all of said discharge resistors, wherein the common heat sink comprises a cooling capacity based on a predefined portion of the discharge resistors,
    wherein the discharge resistor has a positive temperature coefficient (PTC) characteristic,
    wherein the common heat sink is configured with a cooling capacity that corresponds to less than all of the discharge resistors.

11. The device according to claim 1, wherein each balancing circuit is configured to discharge voltage of a respective cell that is in excess of a predetermined amount into the common heat sink via the discharge resistor.

12. The device according to claim 1, wherein the discharge resistors are configured to not operate simultaneously.

13. The method according to claim 5, wherein the discharge resistors are configured to not operate simultaneously.

14. The device according to claim 10, wherein the discharge resistors are configured to not operate simultaneously.

* * * * *